United States Patent [19]
Yang et al.

[11] Patent Number: 6,088,577
[45] Date of Patent: Jul. 11, 2000

[54] MULTIPLE SUBCARRIER COMMUNICATION SYSTEM

[75] Inventors: Michael Y. Yang, Princeton Junction; Albert Wu, Paramus, both of N.J.; William Wu, Fremont, Calif.

[73] Assignee: Clariti Telecommunications International, Ltd., Philadelphia, Pa.

[21] Appl. No.: 09/229,536

[22] Filed: Jan. 13, 1999

[51] Int. Cl.$^7$ ............................... H04B 1/00; H04B 7/00; H04B 1/66; G08B 5/22

[52] U.S. Cl. ...................... 455/45; 455/102; 455/72; 340/825.44

[58] Field of Search .................. 455/38.1, 45, 186.1, 455/72, 102–3, 435–444; 340/825.44; 375/260, 216

[56] References Cited

U.S. PATENT DOCUMENTS

| | | | |
|---|---|---|---|
| 3,846,783 | 11/1974 | Apsell et al. | 340/311 |
| 4,263,480 | 4/1981 | Levine | 179/2 EC |
| 4,336,524 | 6/1982 | Levine | 340/311.1 |
| 4,424,514 | 1/1984 | Fennell et al. | 340/825.52 |
| 4,477,807 | 10/1984 | Nakajima et al. | 340/825.44 |
| 4,479,124 | 10/1984 | Rodriguez et al. | 340/825.44 |
| 4,518,961 | 5/1985 | Davis et al. | 340/825.44 |
| 4,701,943 | 10/1987 | Davis et al. | 379/57 |
| 4,769,642 | 9/1988 | Davis et al. | 340/825.44 |
| 4,829,466 | 5/1989 | Davis et al. | 364/900 |
| 4,849,750 | 7/1989 | Andros et al. | 340/825.44 |
| 4,873,520 | 10/1989 | Fisch et al. | 340/825.44 |
| 4,885,577 | 12/1989 | Nelson | 340/825.44 |
| 4,965,569 | 10/1990 | Bennett et al. | 340/825.44 |
| 4,995,099 | 2/1991 | Davis | 455/343 |
| 5,003,576 | 3/1991 | Helferich | 379/88 |
| 5,020,056 | 5/1991 | Chennakeshu | 370/95.3 |
| 5,065,423 | 11/1991 | Gaskill | 379/57 |
| 5,155,479 | 10/1992 | Ragan | 340/825.44 |
| 5,159,331 | 10/1992 | Park et al. | 340/825.44 |
| 5,159,713 | 10/1992 | Gaskill et al. | 455/344 |
| 5,166,932 | 11/1992 | Hoff et al. | 370/95.1 |
| 5,187,470 | 2/1993 | King et al. | 340/825.44 |
| 5,247,579 | 9/1993 | Hardwick et al. | 381/40 |
| 5,262,769 | 11/1993 | Holmes | 340/825.03 |
| 5,285,496 | 2/1994 | Frank et al. | 380/9 |
| 5,309,154 | 5/1994 | Mun et al. | 340/825.44 |
| 5,311,570 | 5/1994 | Grimes et al. | 379/57 |
| 5,327,581 | 7/1994 | Goldberg | 455/51.2 |
| 5,337,314 | 8/1994 | Hoff et al. | 370/94.1 |
| 5,384,564 | 1/1995 | Wycoff et al. | 340/825.44 |
| 5,390,362 | 2/1995 | Modjeska et al. | 455/38.1 |
| 5,412,719 | 5/1995 | Hamamoto et al. | 380/9 |
| 5,414,419 | 5/1995 | Schwendeman et al. | 340/825.44 |
| 5,418,818 | 5/1995 | Marchetto et al. | 375/264 |
| 5,428,610 | 6/1995 | Davis | 370/73 |
| 5,428,614 | 6/1995 | Shaver | 370/94.1 |
| 5,455,579 | 10/1995 | Bennett et al. | 341/110 |
| 5,463,626 | 10/1995 | Hoff et al. | 370/94.1 |
| 5,481,254 | 1/1996 | Gaskill et al. | 340/825.52 |
| 5,485,463 | 1/1996 | Godoroja | 370/95.1 |
| 5,517,686 | 5/1996 | Kennedy et al. | 455/273 |
| 5,550,829 | 8/1996 | Wang | 370/95.1 |
| 5,551,078 | 8/1996 | Connell et al. | 455/343 |
| 5,552,779 | 9/1996 | Gaskill et al. | 340/825.44 |
| 5,556,081 | 9/1996 | Miura et al. | 267/47 |
| 5,561,702 | 10/1996 | Lipp et al. | 379/57 |
| 5,577,045 | 11/1996 | Faris et al. | 370/94.1 |
| 5,581,576 | 12/1996 | Lanzetta et al. | 375/216 |
| 5,629,940 | 5/1997 | Gaskill | 370/311 |
| 5,644,627 | 7/1997 | Segal et al. | 379/67 |
| 5,648,999 | 7/1997 | Easterling et al. | 455/412 |
| 5,657,376 | 8/1997 | Espeut et al. | 379/89 |
| 5,663,715 | 9/1997 | Godoroia | 340/825.2 |
| 5,694,453 | 12/1997 | Fuller et al. | 379/57 |
| 5,715,517 | 2/1998 | Ide et al. | 355/38.4 |
| 5,719,562 | 2/1998 | Fawcett | 340/825.44 |
| 5,732,357 | 3/1998 | Gayton et al. | 455/503 |
| 5,757,281 | 5/1998 | Schwendeman et al. | 340/825.55 |
| 5,768,526 | 6/1998 | Fawcett | 395/200.59 |
| 5,784,000 | 7/1998 | Sato | 340/825.44 |
| 5,842,123 | 11/1998 | Hamamoto et al. | 455/412 |
| 5,881,365 | 3/1999 | Yang et al. | 455/45 |

*Primary Examiner*—Douglas W. Olms
*Assistant Examiner*—David R Vincent
*Attorney, Agent, or Firm*—McAndrews, Held & Malloy

[57] ABSTRACT

The present invention is a digital FM voice paging system which uses digital signal processing (including D/A conversion and data compression) to transmit voice pager data over existing FM broadcast subcarriers.

30 Claims, 3 Drawing Sheets

MULTIPLE SUBCARRIER COMMUNICATION SYSTEM

BACKGROUND OF THE INVENTION

The present invention is directed to a digital voice paging system using digital signal processing to transmit compressed voice data via the excess FM channel bandwidth associated with an FM broadcast station.

The demand for personal telecommunication devices has increased drastically in the past decade, with the major market growth focused on two products: cellular mobile phones and paging systems. Cellular phone networks require huge front end investment for their initial implementation, and continuous investment to increase the number of cells in order to maintain an acceptable user density level per cell, since the density level grows with the increase in numbers of subscribers. Cellular phone networks also require a developed telephone network encompassing a large coverage area.

Paging systems, on the other hand, require less investment but only provide a one way message service in characters, numbers, or voice messages. The first generation pager was a beeper-based system which "beeped" when a number associated with a specific pager was accessed. Subsequently, numerical based pagers were developed, capable of transmitting a telephone number to a pager device. Both of these systems are "notification" based in that no actual message is sent. The individual carrying the pager needs to call a telephone number to receive a complete message. This presents a problem to users in countries with a low per capita number of telephones. For example, in China only about 1% of the population has access to a telephone. Thus, users of beepers or numeric pagers in such countries may not have ready access to a telephone to receive their messages.

It is estimated that only about 25% of telephone messages are of a nature requiring a message recipient to return a telephone call, i.e. those types of messages which are of significant length. Therefore, paging systems that can transmit messages in either character or voice form may be able to satisfy 75% of the needs of telephone users. A Chinese character pager has been employed in an attempt to satisfy communication requirements in China, allowing the transmission of messages in text form. Unfortunately, given the tremendous number of Chinese characters, it is time consuming to type Chinese messages. A large typist pool is required, resulting in significant expense and managerial effort.

On the other hand, analog voice paging systems have been developed which are capable of transmitting entire voice messages. Due to the nature of transmitting voice messages, (bandwidth and time requirements, etc.) some form of data compression is necessary. Unfortunately, due to technology limitations associated with current voice compression methods, these prior art analog systems have been limited to a maximum compression ratio of 3 to 1 (i.e., a three second message can be compressed into a one second transmission). The compression ratio achievable by such analog systems cannot sustain a user base of more than several hundred users and as such, it is too uneconomical to support a viable business.

Voice paging systems are known as described in U.S. Pat. Nos. 3,553,386; 4,479,124; 4,847,888; 4,870,402; 4,885,577; and 5,412,719.

To transmit more data, either the bandwidth must be increased to provide for more data in a given period of time, or, if bandwidth cannot be increased, a data compression scheme must be used to increase the effective amount of data transferred during a given period of time. Highly sophisticated digital signal processing (DSP) schemes have been employed in military applications for some time, and this technology has recently been made available for commercial applications. Powerful processors implementing this technology can provide a voice message compression ratio of up to 25:1.

Cellular phone and pager systems typically require that a large spectrum of frequencies be dedicated to their services. Clear frequencies, particularly frequencies allocated to cellular phones and paging, are harder and harder to obtain due to the rapid expansion of cellular and paging services. Even when bandwidth has been become available, technology considerations typically associated with operating at these newly available frequencies have forced costs which are prohibitively high.

However, within that area of the radio frequency spectrum associated with FM broadcasting, i.e. the band from 88 to 107 MHz, there is a portion of bandwidth within each FM channel which is not required for transmitting the main FM station broadcast signal, and which has not been fully utilized. Since the inception of FM broadcasting, FM station owners have tried to more efficiently utilize all of their allotted frequency resource including this available "excess" bandwidth.

In the United States, FM radio stations are granted a license to operate an FM radio signal within an assigned range of frequencies called a channel. This range is substantially larger than the minimum range required for the main FM radio signal. A typical FM station is assigned a bandwidth of 200 KHz. Within the positive or one-sided baseband frequency spectrum of 100 KHz bandwidth, an FM station will take up to a maximum of 53 KHz for the main FM stereo broadcasting station, and less for a monoaural station. The remaining portion of the baseband signal from 53 KHz to 99 KHz, approximately 50% of the available FM channel spectrum resource, is not required for broadcasting the main FM station signal.

Radio stations have leased frequencies in the "excess" bandwidth to other users through various subcarrier based systems. One such service is known as Sub-Carrier Administration (SCA). SCA has been used in the United States for over forty years for background music without commercial interruption, reading services for the blind, stock market information, and educational and religious applications. SCA has also been used for data transmission, having the ability to reliably support a data rate of 4,800 bits/second or higher. The FCC has deregulated SCA service and stations are free -to carry SCA services without prior authorization, so long as all uses of the frequency are within the regulations imposed on the license holder.

FM paging systems using SCA are known as described in U.S. Pat. Nos. 4,885,802; 5,170,487; 5,262,769; and 5,428,610.

Thus, use has previously been made of the "excess" portion of the FM channel bandwidth. As a result, the use of in-place FM transmission systems to provide wide coverage paging applications may in some instances be limited due to previous user allocation (e.g., weather information, stock market information, or other type of data transfer). The ability of a paging system to transmit data over the excess portion of an FM channel, via an FM station infrastructure providing wide coverage, is a function of the amount of bandwidth that is available. The paging system operator is otherwise limited in the amount and speed of data transfer by the bandwidth. The use of a narrow bandwidth with voice paging systems is usually not desirable due to the amount of data to be transmitted, but may in fact be necessary.

The RDS (radio data system) system is another subcarrier based data system which has been implemented by the BBC on all BBC FM transmissions in England. Similar systems are available in several European countries under a standard described in "European Broadcasting Union (EBU) no. 3244-F p. 11" in which the RDS system is also described. This publication is herein incorporated by reference. In these systems an RDS subcarrier at 57 kHz is modulated with data signals. The RDS system has a number of message group types. For example, a Group Type 4A message is for clock time and date information and, a Group Type 6A message is for In-House data.

The data rate for the RDS system is 1187.5 bits/second or approximately 11.4 groups/second. Since systems like the RDS system have broad coverage, a number of users can use a data channel on a pro-rata basis.

RDS has been popular in European countries for transmitting traffic-related information to motorists, utilizing the existing FM radio broadcasting infrastructure. However, RDS has a slow data transmission rate and with its myriad of function groups RDS is too slow for effective data transmission. On the other hand, RDS does have additional functional aspects providing for roaming, seeking and locking onto of FM stations transmitting RDS signals.

Thus, given lack of telephone resources in some countries, a need exists for a message system which does not require a message recipient to dial a telephone number to optain a message. Also, given the complex nature of some languages, especially those such as Chinese and Japanese which have hundreds of characters, a need exists for a non-character, voice based message system which does not require a tremendous human interaction to forward messages in character intensive languages.

Given a lack of available bandwidth and in view of the large bandwidth required by voice based message paging systems, a voice paging system using data compression is required.

Finally, given the cost s attendant with setting up any message system, a system which can use currently available, broadcast frequency transmission apparatus is desirable, for example an FM-based system capable of using currently available FM broadcast station equipment.

SUMMARY OF THE INVENTION

The present invention provides a digital voice paging system which utilizes digital signal processing technology combined with present FM broadcasting technology.

The present invention further provides a system which digitizes and compresses an analog voice signal, for subsequent transmission through an FM broadcast SCA channel. Prior to message transmission, a user identification code is transmitted through an FM broadcast channel to alert a specifically identified pager that a message is being sent. The actual message is transmitted at high speed via the SCA channel to the pager. The received messages are stored at the pager until the user requests their playback. The stored message signal is then processed through a digital signal processor for decompression in an audible voice form for playback.

In addition, the present invention provides a paging system which is language independent, and which, optionally together with the automatic seeking and locking capabilities provided by RDS, provides a universally adaptable paging system. The pager is particularly effective in a multilingual area with limited telephone services.

Further, the present invention provides a paging system which is adaptable to existing FM transmitters. Because the present invention provides paging which is "piggy-backed" to an existing FM transmission, a very short start-up time is needed to set up a paging service. Such a service is inexpensive when compared to the extensive transmitter network required for prior art paging systems.

Thus, the present invention provides a paging system which integrates digital signal processing and the functions of SCA and optionally RDS. The RDS channel may be used to seek and lock onto an FM station, and the SCA channel is used to transmit digital pager data, specifically, a digital voice signal transmitted from an FM station at high speed.

In accordance with the present invention, there is provided a paging system which uses at least one subcarrier within an FM channel bandwidth. The paging system includes transmitter and receiver sections. The transmitter section has an identification signal generator and the transmitter transmits the identification signal via a subcarrier of the FM channel. The transmitter further includes a converter for converting an analog voice signal to a digital, compressed message signal. The transmitter transmits the digital, compressed message signal via a subcarrier of the FM channel.

In addition the paging system includes a receiver which produces an alert signal in response to receipt of the transmitted identification signal. The receiver, in response to the alert signal, receives and decodes the digital, compressed message signal. The receiver includes a storage circuit for storing the digital, compressed message signals and digital signal processing circuitry for converting the digital, compressed message to an uncompressed analog voice message. The message is output in response to user input.

Another embodiment of the present invention is directed to a paging system in which an identification signal is converted into an encoded identification signal in accordance with a first predefined format. The encoded identification signal is used to modulate a subcarrier within a commercial FM channel bandwidth. In addition, an analog voice signal is converted into a digital, compressed voice signal. The digital, compressed signal is converted into an encoded message signal having a second predefined format. The encoded message is used to modulate a subcarrier within the commercial FM channel bandwidth. The, modulated subcarriers are transmitted.

A receiver in the second embodiment includes a decoder for decoding a received identification signal in accordance with the first predefined format. An alert signal is produced as a result of the decode. In response to the alert signal, the receiver is enabled to receive the transmitted message signal. The received message signal is decoded in accordance with the second predefined format, to produce a digital, compressed message signal. The digital, compressed message signal is stored in memory. Upon receipt of an output enable signal, the digital, compressed message is converted to a decompressed, analog message signal which is output via a speaker.

Another embodiment of the present invention is directed to a method of communicating data at a high data rate using at least one subcarrier within an FM channel bandwidth. The method steps include receiving identification and analog voice signals, and digitally encoding the signals to form encoded, digital, compressed signals, in accordance with at least one FM subcarrier format.

The method further includes transmitting the encoded, digital compressed signals via at least one FM subcarrier; receiving the encoded signals, storing the received signals; retrieving the stored signals; converting the retreived signals into decompressed, analog signals, and outputting the converted signals.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

The present invention will be described in connection with FIGS. 1, 2 and 3.

Figure 1:
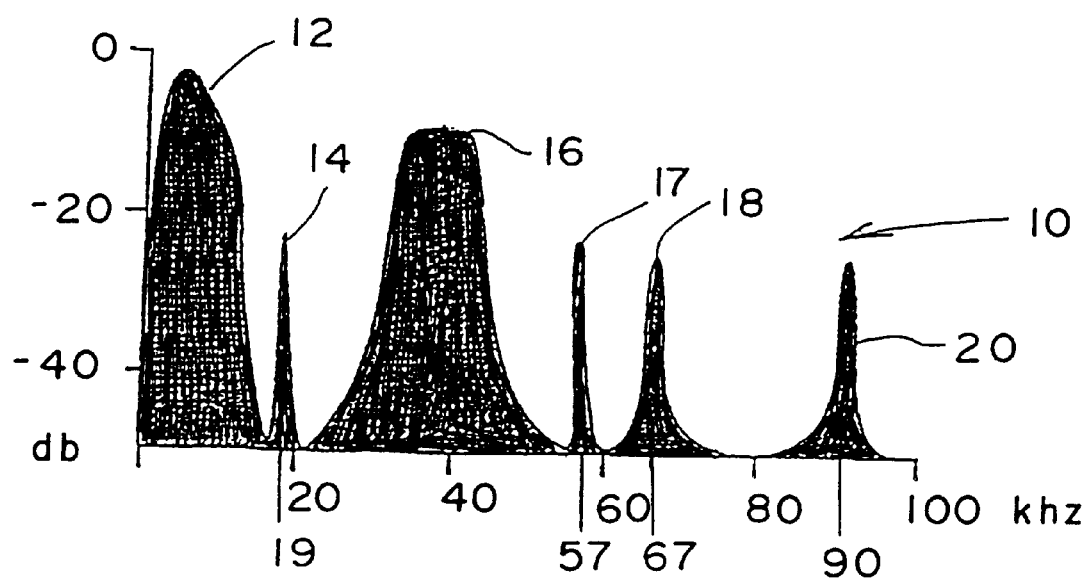
FIG. 1 is a graphical depiction of the spectrum of an FM transmitted signal.

FIG. 1 depicts a typical spectrum 10 associated with FM signals transmitted in accordance with the present invention. This spectrum results from a composite signal which has been used to modulate an FM carrier, and includes the primary FM station broadcast signal and any additional information transmitted, including SCA or RDS formatted information. The present invention preferably operates in the existing FM frequency band which extends from 88 MHz to 107.9 MHz, using subcarrier authorization to define subchannels of the FM channels and using radio data system formatting to accomplish FM signal locking and to transmit identification information.

If the particular station to which the present invention is attached is FM mono, the spectrum 10 includes a monaural audio or combined "L+R" signal 12 extending from about 20 Hz to 15 kHz. In the case of a stereo FM broadcast station, the spectrum contains a pilot tone 14 at 19 kHz to assist stereo multiplex decoding and, a main stereo "L–R" audio signal 16 modulated on a carrier of 38 kHz, extending from about 23 to 53 kHz. In addition, FIG. 1 depicts the situation in which information is being transmitted via RDS and SCA. For example, a modulated RDS subcarrier 17 at approximately 57 kHz, a modulated SCA subcarrier 18 at 67 kHz, and a modulated SCA subcarrier 20 at 92 kHz are part of the composite FM signal which is transmitted in accordance with the subject invention.

In accordance with the subcarrier authorization feature (SCA), each channel is subdivided into first and second subchannels by the use of subcarrier authorization frequencies. The SCA frequencies permit paging functions to be conducted on the standard FM band by using all modulation methods, such as FM, AM, biphase and all others. Since the maximum spectral width of the modulated signal for SCA channels is 15 kHz, the maximum modulating frequency is limited to 7.5 kHz, although the present invention uses data compression to accomplish much higher effective rates of data transmission, as will described later.

Figure 2:
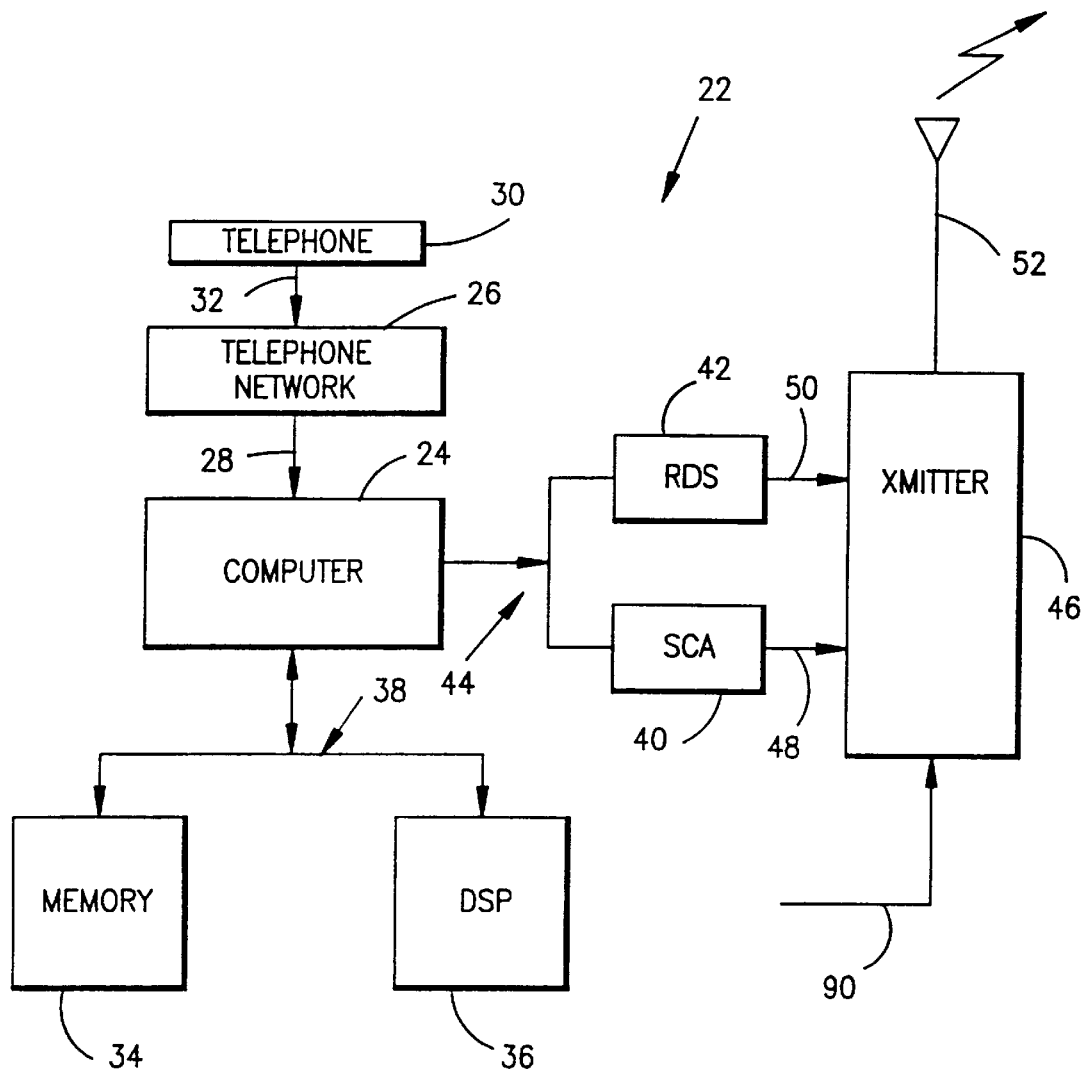
FIG. 2 is a block diagram of a paging base station of the present invention; and, FIG. 3 is a block diagram of a pager of the present invention.

FIG. 2 depicts a paging base station 22 of the present invention. The base station, consisting of accessory equipment built around an existing FM transmitter, contains a call distributor computer 24 connected to a telephone network 26 via signal line 28. The telephone network 26 is connected to telephone 30 via signal line 32. The computer 10 is also connected to memory 34 and digital processing circuitry (DSP) 36 via signal bus 38. The computer 10 is further connected to SubCarrier Administration (SCA) encoder 40 and optionally, Radio Data System (RDS) encoder via signal bus 44. The SCA and RDS encoder circuits are connected to FM transmitter 46 via signal lines 48 and 50 respectively. The FM transmitter includes antenna 52.

Figure 3:
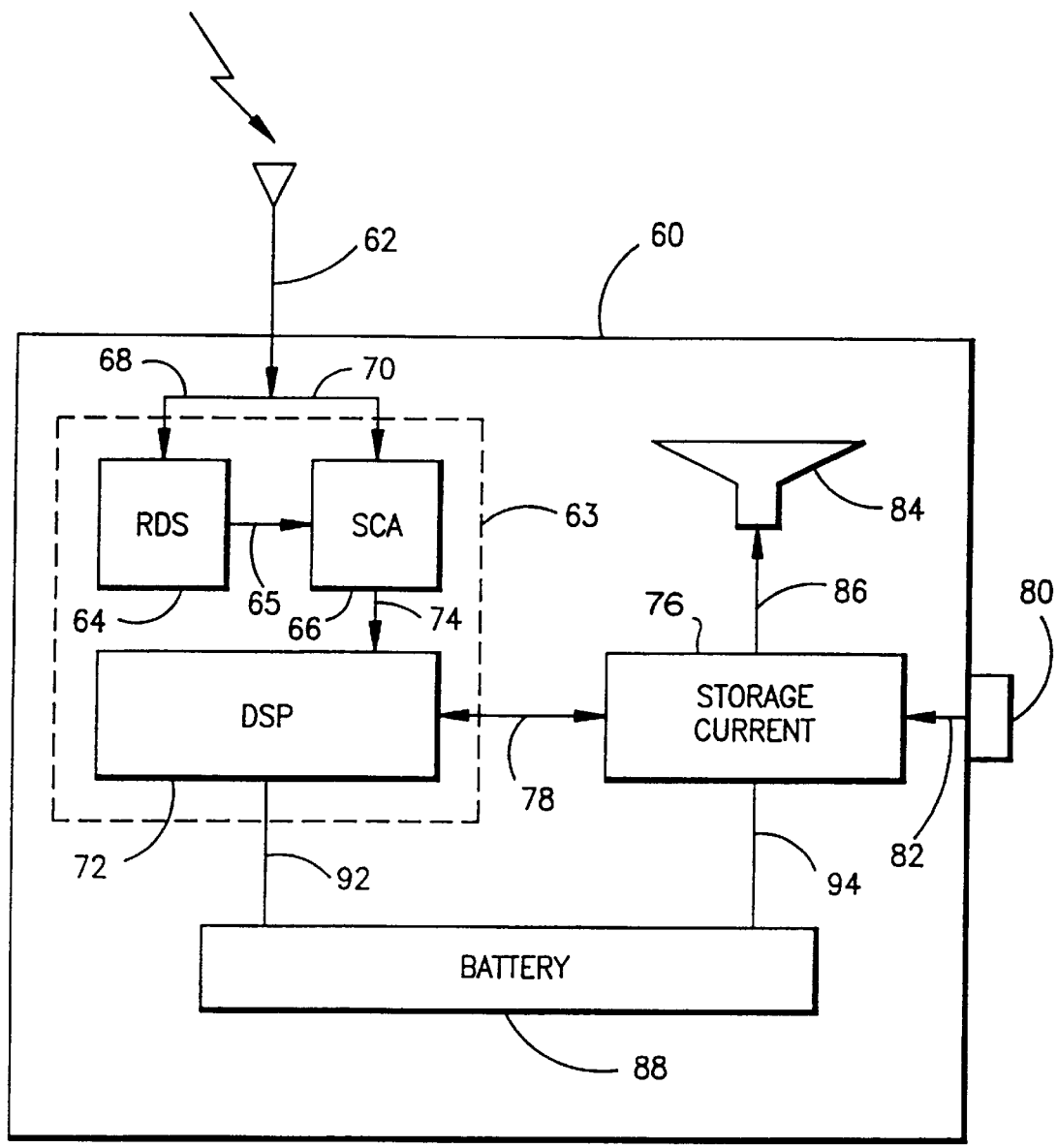

FIG. 3 depicts a pager receiver 60 of the present invention. Antenna 62 is connected to receiver interface circuit 63 via signal lines 68 and 70. Receiver interface circuit 63, in the preferred embodiment, an application specific integrated circuit (ASIC), contains Radio Data System (RDS) decoder 64, Subchannel Authorization (SCA) decoder 66 and digital signal processing circuit 72. Antenna 62 is connected to Radio Data System (RDS) decoder 64 and Subchannel Authorization (SCA) decoder 66 via signal lines 68 and 70 respectively. RDS encoder 66 is connected to SCA decoder 66 via signal line 65. The SCA decoder is connected to digital signal processing (DSP) circuit 72 via signal line 74. The DSP is connected to storage circuit 76 via bidirectional signal line 78. Storage circuit 76 is connected to selection button 80 via signal line 82, and speaker 84 via signal line 86. Battery 88 is connected to each of the circuits of the paging receiver 50.

Turning to a more detailed description of the operation of the present invention, and with reference to FIG. 2, a caller wishing to place a voice page dials telephone 30 with a telephone number specific to a particular pager. Call distributor computer 24 is connected to telephone network 26 and receives the telephone number. If the number is recognized as the identification (I.D.) of a particular pager, the call distributor computer stores the telephone number as the I.D. of a particular pager and prompts the caller to begin speaking his voice message. The analog voice message is transferred from the caller's telephone to the computer 24 via telephone network 26.

The call distributor computer interacts with digital signal processor (DSP) 36 along bidirectional signal bus 38. The analog voice message is acted upon by the DSP circuit to produce a digital, compressed signal which can be temporarily stored in memory 34 for later transmission. Many types of memory are known in the art which can serve as memory 34. The DSP circuit is commonly known from a variety of manufacturers as either a single integrated circuit or as a multiple integrated circuit "chipset", and includes analog to digital conversion and data compression. The computer 24 interacts with Sub-Carrier Administration (SCA) encoder circuit 40 and optionally with Radio Data System (RDS) encoder circuit 42 via signal line bus 44.

The base station 22 can operate in one of two modes. In a first mode the computer outputs a separate, non-compressed I.D. signal to RDS encoder circuit 42, and a digital, compressed version of the original analog message signal to SCA encoder circuit 40. In a second mode of operation, the computer combines the I.D. and message signals to produce a combined, digital, compressed message/I.D. signal. The combined signal is provided to SCA encoder circuit 40. The RDS encoder circuit is not utilized in this mode.

The RDS encoder circuit 42 reformats the input I.D. signal according to standard RDS protocols and outputs an RDS encoded signal along signal line 50 to FM transmitter 46. Similarly, SCA encoder circuit 40 reformats its input signal, either the separate digital, compressed message signal input under first mode operation, or the combined digital, compressed message/I.D. signal, input under the second mode of operation. The SCA encoder circuit 40 outputs an SCA formatted digital signal formatted for SCA transmission along signal line 48 to the FM transmitter 46. The FM transmitter operates as is known in the art. FM subcarriers are modulated with each of the RDS encoded signal input along signal line 50 and the SCA encoded signal input along signal line 48. An FM carrier is modulated with a primary FM station broadcast signal input along signal line 90. The FM transmitter includes an antenna 52 for broadcasting a composite signal consisting of the modulated carrier and subcarrier signals.

Turning to FIG. 3, pager 60 receives FM signals via antenna 62 associated with the pager. The antenna can be either an external antenna or an antenna contained within the pager housing. The antenna supplies signals to an application specific integrated circuit (ASIC) containing the RDS decoder 64, SCA decoder 66 and digital signal processing circuit 72. The ASIC is formed via conventional semiconductor fabrication techniques, as is known in the art. The composite signal received by the pager will contain either a separate I.D. and digital, compressed message signal or a combined, digital, compressed message/I.D. signal. If separate, the I.D. is passed to RDS decoding circuit 64 for decoding. The resulting digital signal is used to generate an "alert" signal which is passed to the SCA decoder circuit 66 to via signal line 65 to "awaken" or alert the pager that a message intended for this particular pager is arriving. The message signal is decoded via the SCA decoder circuit 66 to form the original digital, compressed message signal. This signal is passed to digital signal processing circuit 72.

In the second mode of operation, the combined message/I.D. signal is received via an SCA channel, decoded by the SCA decoder circuit 66 and passed to the digital signal processing circuit (DSP) 72.

The DSP decompresses and converts the received message signal from digital to analog form for immediate playback via speaker 84.

In addition, the digital, compressed message can be stored within storage circuit 74 until called for playback by the pager owner. Once called for playback by the pager owner via selection button 80, the stored message is passed to the DSP circuit for decompression and digital to analog conversion for playback via speaker 84. Storage 74 is a standard memory device, as is well known, and is capable of storing multiple messages.

Battery 88 provides power for the system via, for example, supply lines 92 and 94.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular location of elements may be reversed or interposed, all without departing from the spirit or scope of the invention as defined in the appended claims.

What is claimed is:

1. The paging system of claim 1 wherein said means for transmitting said identification signal further comprises:
    means for converting said identification signal into an encoded identification signal having a first format, and,
    means for transmitting a broadcast identification signal modulated by said encoded identification signal.

2. The method of claim 1, wherein
    the receiver is a member of a plurality of receivers and the identification signal selectively identifies the receiver, and
    the message signal corresponds to the identification signal and enables selective reception of the message signal by the receiver.

3. The method of claim 1, wherein
    the step of modulating an identification signal comprises modulating the identification signal onto a Radio Data System subcarrier of an FM communication channel, and
    the step of modulating a message signal comprises modulating the message signal onto a Subsidiary Communications Authorization subcarrier of an FM communication channel.

4. The paging system of claim 1 wherein said means for receiving is an FM receiver.

5. The paging system of claim 1 wherein at least one of said subcarriers is a Sub-Carrier Administration (SCA) based subcarrier.

6. A paging system using subcarriers within a commercial FM channel bandwidth comprising:
    (1) transmitter means comprising:
        means for generating an identification signal;
        means for converting said identification signal into an encoded identification signal having a first format;
        means for transmitting a broadcast identification signal modulated by said encoded identification signal;
        an analog voice signal;
        means for processing said analog voice signal to produce a compressed digital message signal;
        means for converting said message signal into an encoded message signal having a second format;
        means for transmitting a broadcast message signal modulated by said encoded message signal; and,
    (2) receiver means comprising:
        means for receiving said broadcast identification signal to produce a received identification signal;
        means for decoding said received identification signal to produce an alert signal;
        means for receiving said broadcast message signal, said means responsive to said alert signal to enable receipt of said broadcast message signal to produce a received message signal;
        means for decoding said received message signal to produce a digital, compressed received message signal;
        means for storing at least one of said digital, compressed received message signals;
        an output enable signal;
        means for processing said stored digital, compressed received message signal, said means responsive to said output enable signal to produce an analog, voice signal; and,
        means for outputting said voice signal.

7. The method of claim 6, wherein
    the broadcast signal is received by a receiver being a member of a plurality of receivers for selectively receiving the broadcast signal and the identification signal selectively identifies the receiver, and
    the message signal is selectively recovered in response to the identification.

8. The method of claim 6, wherein
    the step of recovering the identification signal comprises demodulating a Radio Data System subcarrier, and
    the step of recovering the message signal comprises demodulating a Subsidiary Communications Authorization subcarrier.

9. A method of communicating data at a high data rate using at least one subcarrier within an FM channel bandwidth, comprising the steps of:

receiving an identification signal;

receiving an analog voice signal;

digitally encoding said signals to transform said signals into digitally compressed signals in accordance with at least one FM subcarrier format;

transmitting said encoded signals via at least one FM subcarrier;

receiving said encoded signals;

storing said received signals;

retrieving said stored signals; and, outputting said stored signals.

10. The method of communicating of claim 9 where said encoding step includes the addtional steps of:

combining said identification and analog signals to form a combined message signal; and, converting said combined message signal into a digital, compressed message signal.

11. The method of communicating of claim 10 where said transmitting step includes the additional steps of:

providing a first signal having a predetermined frequency to define said subcarrier;

modulating said subcarrier with said digital, compressed message signal;

providing a second signal having a predetermined frequency defining a carrier signal for a said FM channel; and, frequency modulating said modulated subcarrier on said carrier signal, said frequency modulated carrier signal being coupled to an antenna for broadcast to a plurality of mobile receiving systems.

12. The method of communicating of claim 11 where said receiving step includes the additional steps of:

receiving said frequency modulated carrier signal by a mobile receiving system in response to said identification signal;

demodulating said received frequency modulated carrier signal to recover said modulated subcarrier; and, demodulating said subcarrier to recover said digital, compressed message signal.

13. The method of communicating of claim 12 where said retrieving step includes the additional step of:

converting said retrieved signals from a digital, compressed form into an analog message signal.

14. The transmitted signal of claim 13, wherein the receiver is a member of a plurality of receivers and the identification signal selectively identifies the receiver, and the message signal corresponds to the identification signal and enables selective reception of the message signal by the receiver.

15. The transmitted signal of claim 14, further comprising a primary broadcast carrier modulated with primary station signal information, and wherein the first subcarrier is a Radio Data System subcarrier of an FM communication channel.

16. The method of communicating of claim 15 where said receiving step includes the additional steps of:

receiving said frequency modulated carrier signal by a mobile receiving system in response to said identification signal;

demodulating said received frequency modulated carrier signal to recover said modulated first and second subcarriers;

demodulating said first subcarriers to recover said identification signal; and, demodulating said second subcarrier in response to said identification signal to recover said digital, compressed message signal.

17. The method of communicating of claim 16 where said retrieving step includes the additional step of:

converting said retrieved signals from a digital, compressed form into an analog message signal.

18. The transmitted signal of claim 14, wherein the primary broadcast carrier is an FM channel broadcast carrier.

19. A paging transmitter for transmitting messages to a plurality of pagers over a communication channel, the transmitter comprising:

a modulator for modulating an identification signal for a pager of the plurality of pagers onto a first subcarrier of a communication channel to form a first transmit signal;

a modulator for modulating a message signal for selective reception by the pager onto a second subcarrier of the communication channel to form a second transmit signal; and a transmitter for transmitting the first transmit signal and the second transmit signal in the communication channel.

20. The method of claim 19, wherein the first subcarrier is a Radio Data System subcarrier of an FM communication channel.

21. The method of claim 19, wherein the second subcarrier is a Subsidiary Communications Authorization subcarrier of an FM communication channel.

22. The method of claim 20, wherein the second subcarrier is a Subsidiary Communications Authorization subcarrier of an FM communication channel.

23. The method of claim 21, wherein the first subcarrier is a Subsidiary Communications Authorization subcarrier of an FM communication channel.

24. A pager for receiving a message transmitted over a communication channel to a pager, the pager comprising:

an antenna for receiving a broadcast signal in a communication channel; and a demodulator coupled to the antenna for recovering an identification signal indicative of the pager carried on a first subcarrier in the broadcast signal and for recovering a message signal carried on a second subcarrier in the broadcast signal in response to the identification signal.

25. The pager of claim 24, wherein the first subcarrier is a Radio Data System subcarrier.

26. The pager of claim 24, wherein the second subcarrier is a Subsidiary Communications Authorization subcarrier.

27. The pager of claim 25, wherein the second subcarrier is a Subsidiary Communications Authorization subcarrier.

28. The pager of claim 26, wherein the first subcarrier is a Subsidiary Communications Authorization subcarrier.

29. The pager of claim 24, further comprising:

a decoder for producing an alert signal in response to the identification signal; and circuitry for enabling the pager to recover the message signal based on the alert signal.

30. The pager of claim 29, further comprising:

circuitry for outputting to a speaker in the pager a voice signal represented by the message signal.

* * * * *

UNITED STATES PATENT AND TRADEMARK OFFICE
CERTIFICATE OF CORRECTION

PATENT NO.    : 6,088,577
DATED         : July 11, 2000
INVENTOR(S)   : Michael Y. Yang et al.

It is certified that error appears in the above-identified patent and that said Letters Patent is hereby corrected as shown below:

Column 7,
Line 58, claim 1, should read as follows:

1.   A method for transmitting messages to a receiver over a communication channel, the method comprising:

modulating an identification signal for a receiver onto a first subcarrier in a communication channel to form a first transmit signal;
   modulating a message signal for the receiver onto a second subcarrier in the communication channel to form a second transmit signal; and
   transmitting the first transmit signal and the second transmit signal in the communication channel.

Column 8,
Lines 13-49, claims 4-6, should read as follows:

4.   The method of claim 2, wherein the step of modulating a message signal comprises modulating the message signal onto a Subsidiary Communications Authorization subcarrier of an FM communication channel.

5.   The method of claim 3, wherein the step of modulating an identification signal comprises modulating the identification signal onto a second Subsidiary Communications Authorization subcarrier of an FM communication channel.

6.   A method of receiving a message transmitted over a communication channel to a receiver, the method comprising:
   receiving a broadcast signal in a communication channel;
   recovering an identification signal carried on a first subcarrier in the broadcast signal; and
   recovering a message signal carried on a second subcarrier in the broadcast signal.

UNITED STATES PATENT AND TRADEMARK OFFICE
CERTIFICATE OF CORRECTION

PATENT NO.   : 6,088,577
DATED        : July 11, 2000
INVENTOR(S)  : Michael Y. Yang et al.

It is certified that error appears in the above-identified patent and that said Letters Patent is hereby corrected as shown below:

<u>Column 8, line 65 - Column 9, line 47,</u>
Claims 9-13, should read as follows:

9.  The method of claim 7, wherein the step of recovering the message signal comprises demodulating a Subsidiary Communications Authorization subcarrier.

10. The method of claim 8, wherein the step of recovering the identification signal comprises demodulating a second Subsidiary Communications Authorization subcarrier.

11. The method of claim 7, further comprising:
    producing an alert signal in response to the identification signal; and
    enabling the receiver to recover the message signal based on the alert signal.

12. The method of claim 11, further comprising:
    outputting from the receiver a voice signal represented by the message signal.

13. A transmitted signal comprising:
    a first subcarrier modulated with an identification signal identifying a receiver; and
    a second subcarrier modulated with a message signal for the receiver.

UNITED STATES PATENT AND TRADEMARK OFFICE
CERTIFICATE OF CORRECTION

PATENT NO.   : 6,088,577
DATED         : July 11, 2000
INVENTOR(S)  : Michael Y. Yang et al.

It is certified that error appears in the above-identified patent and that said Letters Patent is hereby corrected as shown below:

<u>Column 9, line 60 - Column 10, line 9,</u>
Claims 16-17, should read as follows:

16. The transmitted signal of claim 14, wherein the second subcarrier is a Subsidiary Communications Authorization subcarrier of an FM communication channel.

17. The transmitted signal of claim 16, wherein the first subcarrier is a second Subsidiary Communications Authorization subcarrier of the FM communication channel.

Signed and Sealed this

Eighth Day of June, 2004

JON W. DUDAS
*Acting Director of the United States Patent and Trademark Office*